(12) United States Patent
Hirose et al.

(10) Patent No.: US 11,772,604 B2
(45) Date of Patent: Oct. 3, 2023

(54) POSITION ESTIMATION METHOD FOR MOBILE TERMINAL, POSITION ESTIMATION DEVICE FOR MOBILE TERMINAL AND POSITION ESTIMATION SYSTEM FOR MOBILE TERMINAL

(71) Applicant: AISIN CORPORATION, Aichi (JP)

(72) Inventors: Hideaki Hirose, Kariya (JP); Takahiro Kako, Kariya (JP); Michihiro Ogura, Kariya (JP); Hiroaki Yamamoto, Kariya (JP); Kenichi Taguchi, Kariya (JP); Nobuyasu Miwa, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/528,419

(22) Filed: Nov. 17, 2021

(65) Prior Publication Data

US 2022/0161759 A1 May 26, 2022

(30) Foreign Application Priority Data

Nov. 24, 2020 (JP) ................................. 2020-194641

(51) Int. Cl.
*B60R 25/24* (2013.01)
*G07C 9/00* (2020.01)
*G01S 11/06* (2006.01)

(52) U.S. Cl.
CPC ............ *B60R 25/245* (2013.01); *G01S 11/06* (2013.01); *G07C 9/00309* (2013.01);
(Continued)

(58) Field of Classification Search
CPC ..... B60R 25/245; G01S 11/06; G01S 13/765; G07C 9/00309; G07C 2209/63; H04W 4/40; H04W 4/023
See application file for complete search history.

(56) References Cited

U.S. PATENT DOCUMENTS

| 7,962,150 B2 | 6/2011 | Hertzog et al. |
| 8,930,045 B2 | 1/2015 | Oman et al. |

(Continued)

FOREIGN PATENT DOCUMENTS

| JP | 2009-253494 A | 10/2009 |
| JP | 2011-099809 A | 5/2011 |

(Continued)

*Primary Examiner* — Vernal U Brown
(74) *Attorney, Agent, or Firm* — Sughrue Mion, PLLC

(57) ABSTRACT

A position estimation method for estimating a position of a mobile terminal includes: an acquisition step of acquiring distance values and radio wave intensity values between a plurality of communication devices provided in a vehicle and the mobile terminal by communicating the communication devices with the mobile terminal; a communication availability determination step of determining that a corresponding communication device is communicable when the distance value is equal to or less than a first predetermined value and the intensity value is equal to or more than a second predetermined value; and an estimation step of narrowing down a search range of the mobile terminal based on a distance value from the communication device having the smallest distance value of at least three of communication devices determined to be communicable in the communication availability determination step, and estimating the position of the mobile terminal.

9 Claims, 9 Drawing Sheets

(52) U.S. Cl.
CPC .............. *G07C 2009/00555* (2013.01); *G07C 2009/00769* (2013.01); *G07C 2209/63* (2013.01)

(56) References Cited

U.S. PATENT DOCUMENTS

| | | |
|---|---|---|
| 9,679,430 B2 | 6/2017 | O'Brien et al. |
| 10,555,133 B1* | 2/2020 | Cohen ................... H04W 4/026 |
| 2012/0244877 A1* | 9/2012 | Margalef ............... G08C 17/02 |
| | | 455/456.1 |
| 2021/0092704 A1 | 3/2021 | Kusumoto et al. |

FOREIGN PATENT DOCUMENTS

| | | |
|---|---|---|
| JP | 2019-203785 A | 11/2019 |
| JP | 2019-215303 A | 12/2019 |
| JP | 2020-071199 A | 5/2020 |
| JP | 2020-112418 A | 7/2020 |
| JP | 2020-122727 A | 8/2020 |

\* cited by examiner

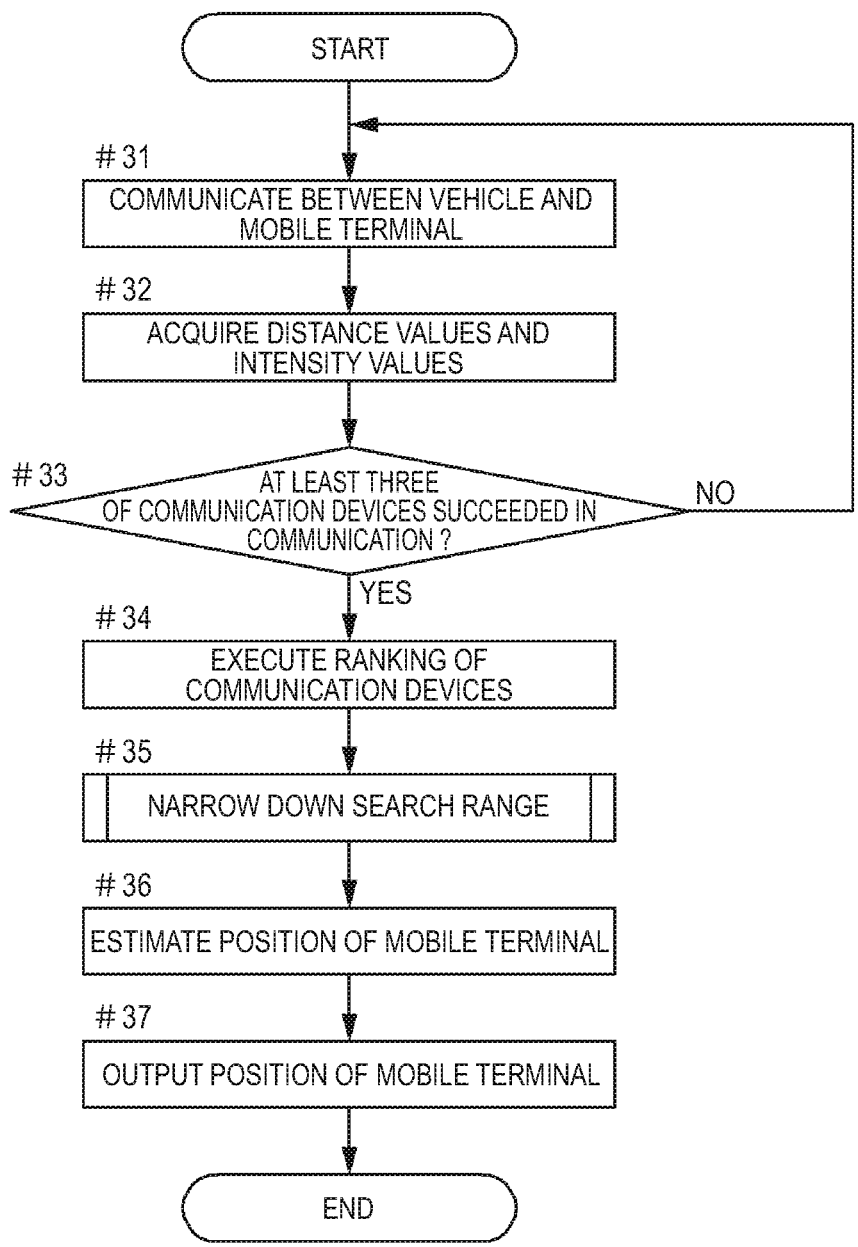

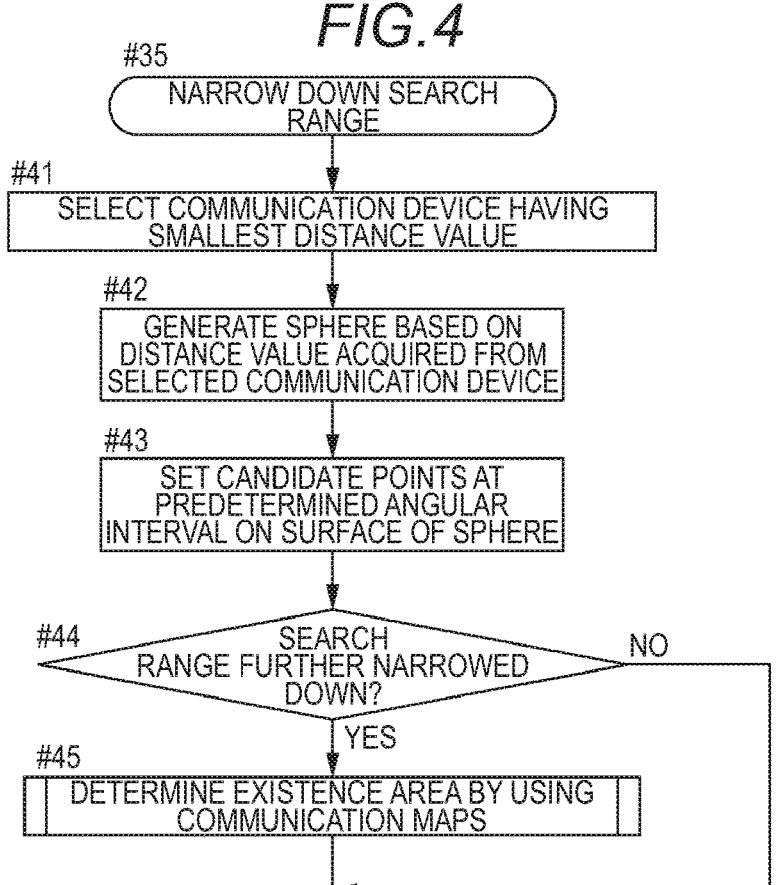
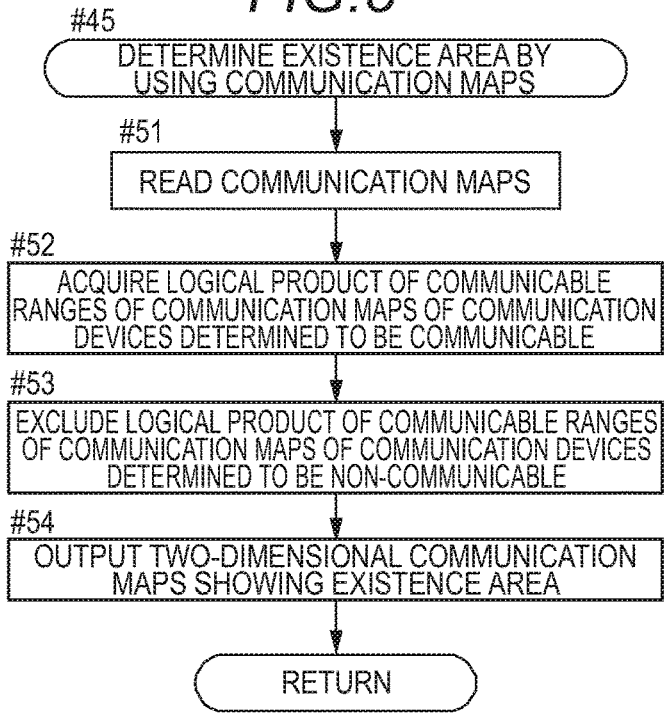

FIG.6

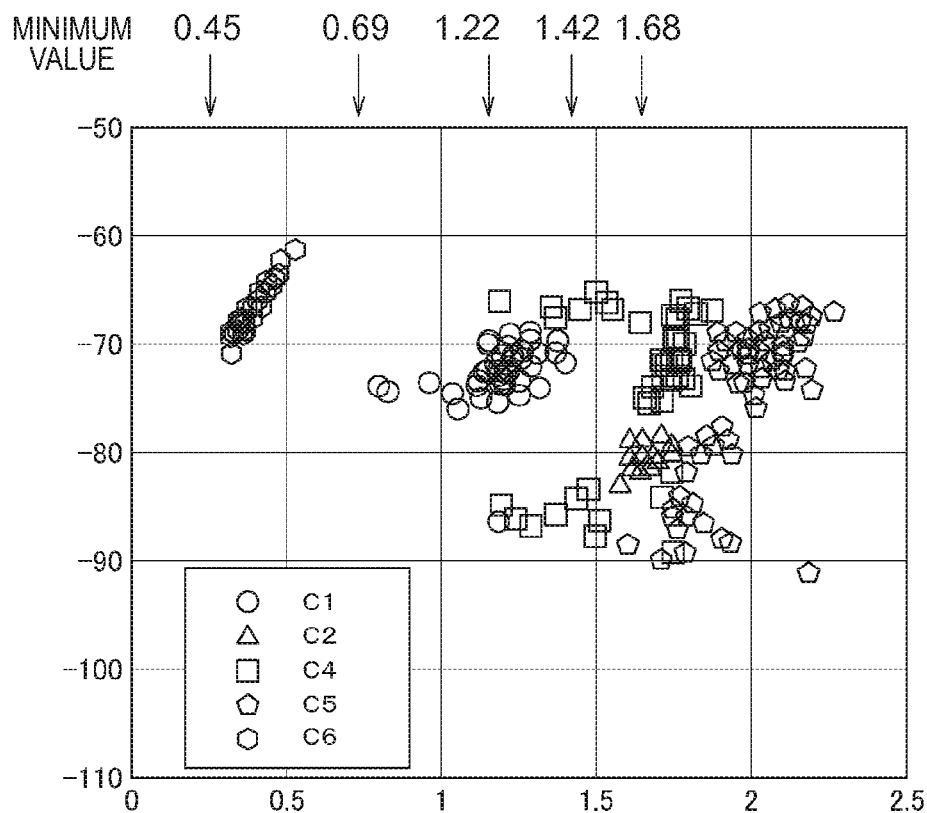

FIG.7

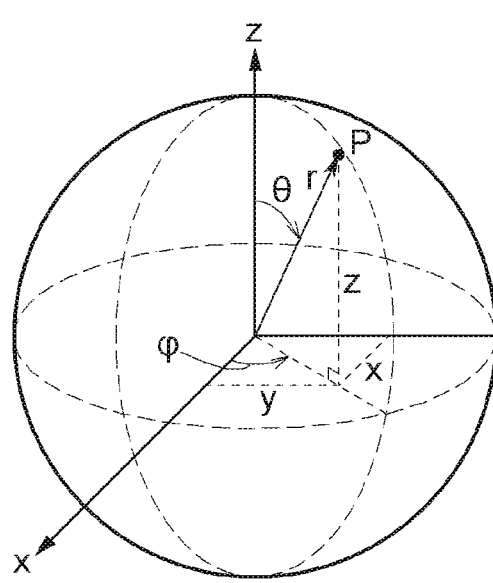

$x = r \sin \theta \cos \varphi$
$y = r \sin \theta \sin \varphi$
$z = r \cos \theta$ $r$: RANGING VALUE ACQUIRED FROM KEY COMMUNICATION DEVICE
$\theta$: ELEVATION ANGLE
$\varphi$: AZIMUTH ANGLE $$\hat{x} = \arg\min \left\{ \sum_{i=1}^{N} (r_i - \|x - x_i\|)^2 \right\}$$

$r_i$: RANGING VALUE ACQUIRED FROM EACH COMMUNICATION DEVICE
$x_i$: THREE-DIMENSIONAL COORDINATE OF EACH COMMUNICATION DEVICE
$x$: THREE-DIMENSIONAL COORDINATE OF EXISTENCE CANDIDATE POSITION
$N$: TOTAL NUMBER OF COMMUNICATION DEVICES

POSITION ESTIMATION METHOD FOR MOBILE TERMINAL, POSITION ESTIMATION DEVICE FOR MOBILE TERMINAL AND POSITION ESTIMATION SYSTEM FOR MOBILE TERMINAL

CROSS REFERENCE TO RELATED APPLICATIONS

This application is based on and claims priority under 35 U.S.C. § 119 to Japanese Patent Application 2020-194641, filed on Nov. 24, 2020, the entire content of which is incorporated herein by reference.

TECHNICAL FIELD

This disclosure relates to a position estimation method for a mobile terminal, a position estimation device for a mobile terminal and a position estimation system for a mobile terminal which estimate the position of a mobile terminal in a vicinity of a vehicle.

BACKGROUND DISCUSSION

In the related art, there has been known a position estimation method for a mobile terminal which estimates a position of a mobile terminal constituted with a smart key, a smartphone or the like (for example, see JP 2019-215303A (Reference 1) and JP 2020-122727A (Reference 2)).

A position estimation method for a mobile terminal described in Reference 1 estimates the position of a mobile terminal based on a low frequency band signal transmitted from a vehicle side and a high frequency band signal transmitted from the mobile terminal. However, a theft (so-called relay attack) caused by relaying these signals to unlock a vehicle door has become a problem, and in order to solve this problem, a technique of unlocking the vehicle door only when the position of a mobile terminal body can be detected near the vehicle has been developed. In order to accurately estimate the position of the mobile terminal, there has been known a position estimation method for a mobile terminal having an improved ranging performance though a high-speed communication using an ultra wide band (UWB) band signal (for example, see Reference 2).

The position estimation method for a mobile terminal described in Reference 1 estimates the position of the mobile terminal based on an approximate equation of two variables, which are a distance from a transmitting antenna provided in a vehicle to the mobile terminal and an angle in a direction where the mobile terminal is located with respect to an axial direction of the transmitting antenna. An approximate equation for each of the transmitting antennas is applied to a plurality of candidate positions set around the transmitting antennas, and candidate positions within a predetermined range are estimated as the positions of the mobile terminal.

The position estimation method of a mobile terminal described in Reference 2 calculates position coordinates of the mobile terminal when there are at least three of in-vehicle communication devices capable of communicating with the mobile terminal, and determines whether the mobile terminal exists in a system operating area when there are less than three in-vehicle communication devices capable of communicating with the mobile terminal.

In the position estimation method for a mobile terminal described in Reference 1, since a special number of positions are listed as the candidate positions of the mobile terminal and a calculation is performed by using an approximate equation for each of the transmitting antennas, a ranging accuracy is low.

Although in the position estimation method for a mobile terminal described in Reference 2, a distance to the mobile terminal is calculated by using the communication device that is communicable, and a rough existence area of the mobile terminal is determined, for example, since a communication device provided on the door includes communication areas inside and outside the vehicle, it is impossible to accurately identify whether the mobile terminal exists inside the vehicle or outside the vehicle.

A need thus exists for a position estimation method for a mobile terminal, a position estimation device for a mobile terminal, and a position estimation system for a mobile terminal which are not susceptible to the drawback mentioned above.

SUMMARY

A position estimation method for a mobile terminal according to this disclosure is a position estimation method for a mobile terminal that estimates a position of a mobile terminal by communicating at least three of communication devices provided in a vehicle with the mobile terminal in a vicinity of the vehicle, the method includes: an acquisition step of acquiring distance values and radio wave intensity values between a plurality of the communication devices and the mobile terminal by communicating the communication devices with the mobile terminal; a communication availability determination step of determining that a corresponding communication device is communicable when the distance value is equal to or less than a first predetermined value and the intensity value is equal to or more than a second predetermined value; and an estimation step of narrowing down a search range of the mobile terminal based on a distance value from the communication device having the smallest distance value of at least three of communication devices determined to be communicable in the communication availability determination step, and estimating the position of the mobile terminal.

A position estimation device for a mobile terminal according to this disclosure is a position estimation device for a mobile terminal that estimates a position of a mobile terminal by communicating a plurality of communication devices provided in a vehicle with the mobile terminal in a vicinity of the vehicle, the device includes: a signal processing unit configured to acquire distance values and radio wave intensity values between the plurality of communication devices and the mobile terminal by communicating the communication devices with the mobile terminal, and determine that a corresponding communication device is communicable when the distance value is equal to or less than a first predetermined value and the intensity value is equal to or more than a second predetermined value; and an estimation unit configured to narrow down a search range of the mobile terminal based on a distance value from the communication device having the smallest distance value of at least three of communication devices determined to be communicable by the signal processing unit, and estimate the position of the mobile terminal.

A position estimation system for a mobile terminal according to this disclosure includes: a plurality of communication devices provided in a vehicle; a signal processing unit configured to acquire distance values and radio wave intensity values between the plurality of communication devices and a mobile terminal in a vicinity of the vehicle by communicating the communication devices with the mobile terminal, and determine that a corresponding communication device is communicable when the distance value is equal to or less than a first predetermined value and the intensity value is equal to or more than a second predetermined value; and an estimation unit configured to narrow down a search range of the mobile terminal based on a distance value from the communication device having the smallest distance value of at least three of communication devices determined to be communicable by the signal processing unit, and estimate the position of the mobile terminal.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a flow diagram showing a position estimation method for a mobile terminal according to this embodiment;

FIG. 4 is a subroutine of narrowing down a search range;

FIG. 5 is a subroutine of determining an existence area of a mobile terminal;

FIG. 6 shows examples of a distance value and an intensity value;

FIG. 7 is a diagram illustrating a position estimation method for a mobile terminal according to this embodiment;

DETAILED DESCRIPTION

Figure 1:
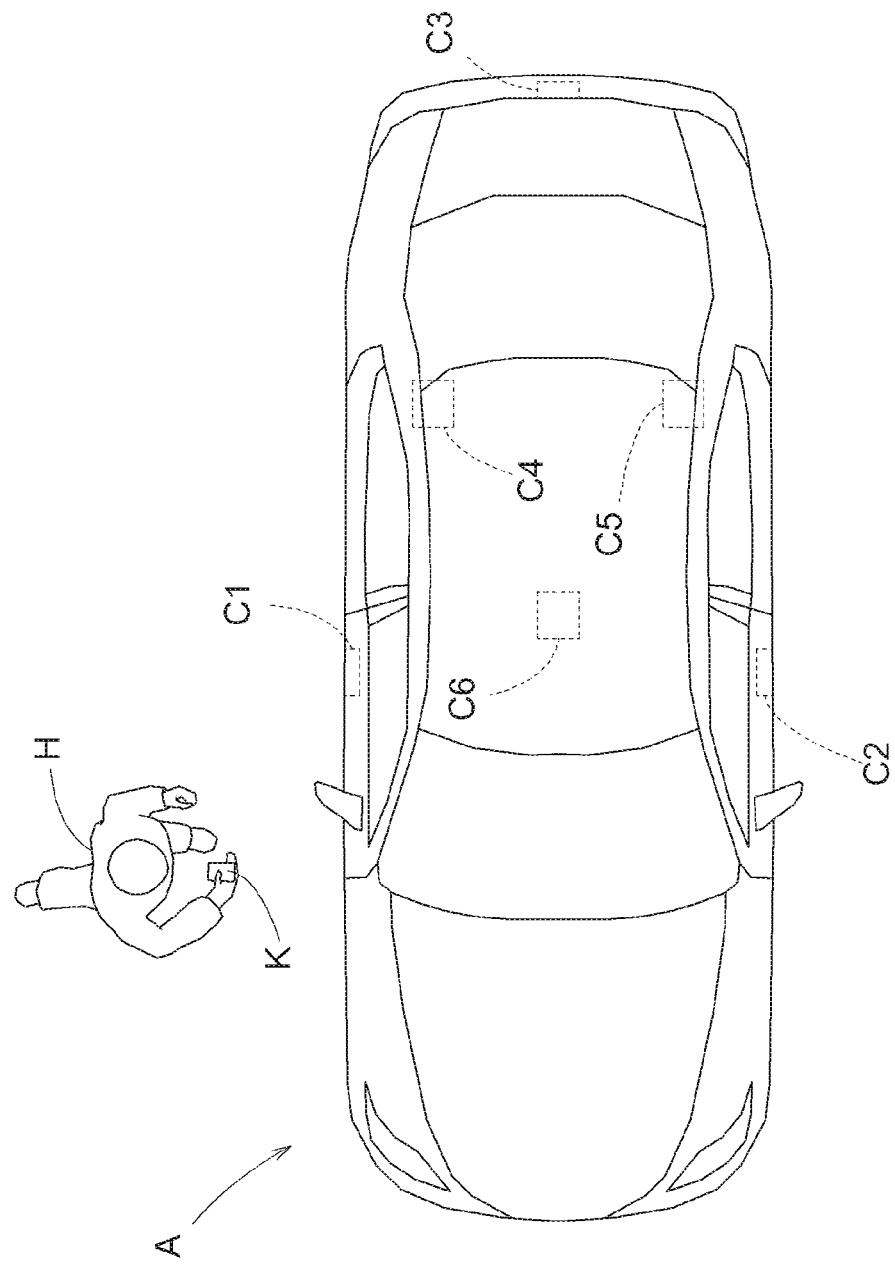
FIG. 1 is a diagram showing setting positions of communication devices.
Figure 2:
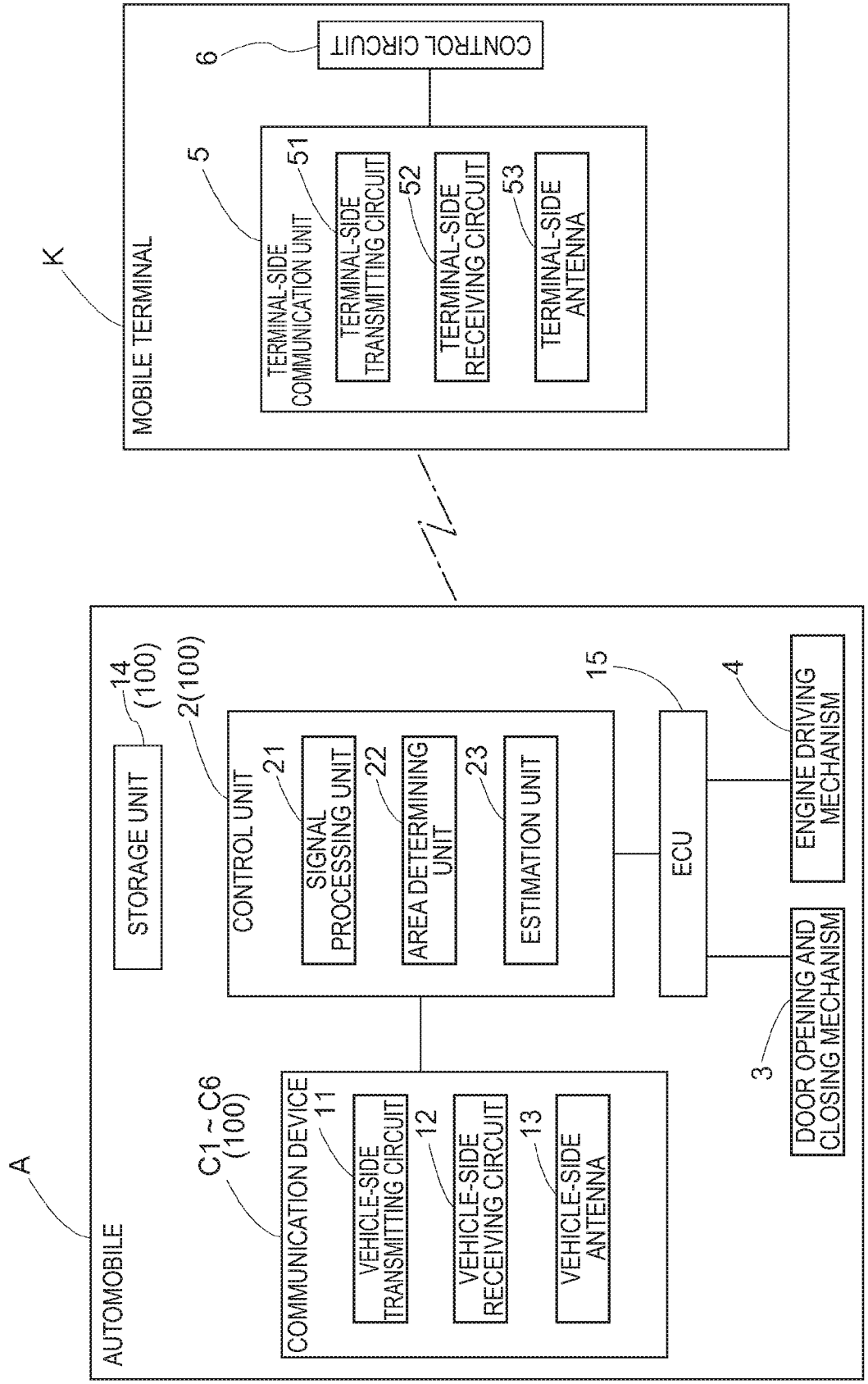
FIG. 2 is a block diagram of a position estimation system for a mobile terminal.

Hereinafter, embodiments of a position estimation method for a mobile terminal, a position estimation device for a mobile terminal and a position estimation system for a mobile terminal disclosed here are described with reference to the drawings. As shown in FIGS. 1 and 2, as an example of the position estimation method for a mobile terminal according to this embodiment, a position estimation method for a mobile terminal using a position estimation system 100 for a mobile terminal will be described. However, this disclosure is not limited to the following embodiment, and various modifications can be made without departing from the scope of this disclosure.

Basic Configuration

As shown in FIGS. 1 and 2, an automobile A (an example of a vehicle) includes the position estimation system 100 for a mobile terminal, an electronic control unit (ECU) 15, a door opening and closing mechanism 3, and an engine driving mechanism 4. The position estimation system 100 for a mobile terminal includes a plurality of communication devices C1 to C6 (six in this embodiment), a storage unit 14, and a control unit 2. Further, in the position estimation system 100 for a mobile terminal, the storage unit 14 and the control unit 2 are configured as a position estimation device for a mobile terminal. A mobile terminal K includes a terminal-side communication unit 5 and a control circuit 6. The control unit 2 and the ECU 15 are capable of reading and writing predetermined data with respect to the storage unit 14, and the communication devices C1 to C6, the control unit 2, the ECU 15, the door opening and closing mechanism 3 and the engine driving mechanism 4 are electrically connected, for example, through a communication line in the automobile such as control area network (CAN) or local interconnect network (LIN) so as to perform bidirectional communication. The mobile terminal K includes a smartphone, a smart key and the like, and hereafter, the mobile terminal K is described as a smartphone.

In the position estimation method for a mobile terminal according to this embodiment, the position estimation system 100 for a mobile terminal is used so as to estimate the position of the mobile terminal K in the vicinity of the automobile A by communication between the communication devices C1 to C6 provided in the automobile A and the mobile terminal K owned by a user H.

The communication devices C1 to C6 are provided inside resin parts of the automobile A. In order to accurately estimate the position of the mobile terminal K that may exist inside and outside a vehicle cabin, the communication devices C1 to C6 are preferably provided inside and outside the vehicle cabin of the automobile A, respectively. Positions where these communication devices C1 to C6 are provided include the inside of a door handle, a molding, a bumper or an emblem if it is outside the vehicle cabin, and include the inside of an A, B, C or D pillar, a center console box or a front console box if it is inside the vehicle cabin. In this embodiment, a first communication device C1 is provided inside a right door handle, a second communication device C2 is provided inside a left door handle, a third communication device C3 is provided inside a back emblem, a fourth communication device C4 is provided inside a right C pillar, a fifth communication device C5 is provided inside a left C pillar, and a sixth communication device C6 is provided inside the center console box.

The communication devices C1 to C6 are ultra wide band wireless devices using a signal in an ultra wide band (UWB) band. UWB communication is a wireless communication using a bandwidth of 500 MHz or more, and in this embodiment, a frequency band of 3 GHz to 10 GHz is used. This UWB communication has a feature of low power consumption and resistance to interfering radio waves, and is suitable for short-distance communication with a radius of about 10 m. In this range, it is possible to estimate the position of the mobile terminal K with a communication error of about several centimeters to several tens centimeters.

Each of the communication devices C1 to C6 has a vehicle-side transmitting circuit 11, a vehicle-side receiving circuit 12, and a vehicle-side antenna 13. The communication devices C1 to C6 are controlled by the control unit 2 and are configured to perform bidirectional communication with the control unit 2. The "circuit" in this embodiment is a general form which, for example, includes a circuit mounted with multiple electronic components on one substrate, and a so-called integrated circuit (IC) in which functions of a plurality of electronic components are integrated into one chip. The same also applies to the following.

The vehicle-side transmitting circuit 11 is a polling message generation circuit that generates a response request signal with respect to the mobile terminal K. Regarding a timing at which the vehicle-side transmitting circuit 11 generates a response request signal, the generation may always be performed, or may be performed periodically when the mobile terminal K is detected by other communication (for example, wireless communication by Bluetooth (registered trademark)). The vehicle-side transmitting circuit 11 modulates an input signal from the control unit 2 by a known modulation method, emits a response request signal as a radio wave from the vehicle-side antenna 13, and starts a time counting at a timing when this response request signal is transmitted.

The vehicle-side receiving circuit 12 is a response message receiving circuit that receives a response signal from the mobile terminal K. The vehicle-side receiving circuit 12 demodulates the response signal received from the vehicle-side antenna 13, transmits the response signal to the control unit 2, and ends the time counting at a timing when the response signal is received. The response signal received by the vehicle-side receiving circuit 12 includes the received radio wave intensity value, a time Tb required for the mobile terminal K to transmit a response signal after receiving a radio wave, and identification information (ID) of the mobile terminal K. The response signal received by the vehicle-side receiving circuit 12 is transmitted to the control unit 2, and the mobile terminal K is collated by the control unit 2, and the distance value between the authenticated mobile terminal K and each of the communication devices C1 to C6 is calculated.

The distance value between each of the communication devices C1 to C6 and the mobile terminal K can be calculated by, for example, single-sided two-way ranging method (TWR-SS) based on a time of flight (TOF) method. According to the single-sided two-way ranging method, the distance value is calculated by multiplying half of a difference, which is acquired by subtracting the time Tb required for the mobile terminal K to transmit a response signal after receiving a response request signal from a time Ta required for transmitting the response request signal from the vehicle-side antenna 13 and then receiving the response signal, that is, ((Ta−Tb)/2), by a propagation speed V of the radio wave, that is, (V×(Ta−Tb)/2). In this embodiment, although this distance value is calculated by the control unit 2, this distance value may be calculated by each of the communication devices C1 to C6.

The vehicle-side antenna 13 emits a response request signal modulated by the vehicle-side transmitting circuit 11 as a radio wave, and receives a response signal from the mobile terminal K as a radio wave. The vehicle-side antenna 13 may be separately provided with a transmitting antenna for transmitting a response request signal and a receiving antenna for receiving the response signal, and the transmitting antenna and the receiving antenna may be shared by one antenna element.

The storage unit 14 is constituted with hardware such as an HDD and a ROM, and stores a program run by the control unit 2 or the ECU 15, three-dimensional position coordinates of the communication devices C1 to C6 with an optional position of the automobile A (for example, the position of the first communication device C1) as an origin, and communication maps M1 to M6 (see FIG. 11) in which the communicable ranges of the communication devices C1 to C6 are mapped.

The control unit 2 controls operations of the communication devices C1 to C6, and processes signals received from the communication devices C1 to C6 so as to estimate the position of the mobile terminal K and output an estimation result to the ECU 15. Further, the ECU 15 controls operations of the door opening and closing mechanism 3 and the engine driving mechanism 4 based on the position of the mobile terminal K estimated by the control unit 2 (a so called keyless entry system). A detailed configuration of the control unit 2 will be described later.

The door opening and closing mechanism 3 includes a key door button, a touch sensor or the like by which the user H unlocks or locks the vehicle door. Since the door opening and closing mechanism 3 is a well-known mechanism in which the user H presses the key door button or touches the touch sensor with a hand so as to unlock or lock the vehicle door, detailed descriptions are omitted. In this embodiment, the ECU 15 transmits an operation signal to the door opening and closing mechanism 3 based on the position of the mobile terminal K estimated by the control unit 2, so that the user H can unlock or lock a vehicle door near the mobile terminal K without pressing the key door button, or the like. Further, the ECU 15 transmits an operation signal to the door opening and closing mechanism 3 based on the position of the mobile terminal K estimated by the control unit 2, so that the user H can open or close the vehicle door near the mobile terminal K.

The engine driving mechanism 4 has a mobile starter, a push switch or the like by which the user H drives the engine of the automobile A. Since the engine driving mechanism 4 is a well-known mechanism in which the user H presses the starter or the push switch so as to cause the engine to be driven by a cell motor, detailed descriptions are omitted. In this embodiment, when the control unit 2 estimates that the mobile terminal K exists inside the vehicle cabin, the ECU 15 transmits an operation signal to the engine driving mechanism 4, and the engine is in a drivable stand-by state.

As described above, the mobile terminal K includes the terminal-side communication unit 5 and the control circuit 6. The terminal-side communication unit 5 includes a terminal-side transmitting circuit 51, a terminal-side receiving circuit 52 and a terminal-side antenna 53.

The terminal-side receiving circuit 52 receives a response request signal transmitted from the vehicle-side antenna 13 via the terminal-side antenna 53, and the terminal-side transmitting circuit 51 transmits a response signal to the vehicle-side antenna 13 via the terminal-side antenna 53. The terminal-side receiving circuit 52 demodulates the response signal received from the terminal-side antenna 53 and transmits the response signal to the control circuit 6. The terminal-side transmitting circuit 51 transmits a response signal acquired by modulating an input signal from the control circuit 6 with a well-known modulation method from the terminal-side antenna 53 to the vehicle-side antenna 13. The control circuit 6 generates an input signal including the time Tb required for the mobile terminal K to transmit a response signal after receiving a radio wave and the identification information (ID) of the mobile terminal K. In addition, the time Tb required from the reception of a radio wave by the mobile terminal K to response may be a preset time, or may be a time measured each time a radio wave is received.

Details of Control Unit

The control unit 2 includes a signal processing unit 21, an area determining unit 22 and an estimation unit 23. Each functional unit of the control unit 2 is configured by software using a CPU that executes various processes and a memory as cores, or collaboration between hardware and software. In addition, the area determining unit 22 may be omitted.

The signal processing unit 21 processes electrical signals transmitted and received between the communication devices C1 to C6. The signal processing unit 21 executes a polling control of each of the communication devices C1 to C6, calculates and acquires the distance value between each of the communication devices C1 to C6 mentioned above and the mobile terminal K, and also acquires the intensity value from the mobile terminal K received by each of the communication devices C1 to C6 (an acquisition step, see FIG. 6).

The signal processing unit 21 determines that the communication devices C1 to C6 are communicable when the distance value from each of the communication devices C1 to C6 is equal to or less than a first predetermined value and the intensity value from each of the communication devices C1 to C6 is equal to or more than a second predetermined value (a communication availability determination step). However, the signal processing unit 21 determines that the communication devices C1 to C6 are not communicable when the distance value from each of the communication devices C1 to C6 is more than the first predetermined value, or when the intensity value from each of the communication devices C1 to C6 is less than the second predetermined value (the communication availability determination step). The first predetermined value is set as a value (for example, 10 m) that is so large that the value is theoretically unrealistic as the ranging value, may be set according to a provided location of each of the communication devices C1 to C6, or may be set uniformly. The second predetermined value is set as a value (for example, −105 dBm) that can be regarded as a noise level, may be set according to the provided location of each of the communication devices C1 to C6, or may be set uniformly.

The area determining unit 22 determines an area where the mobile terminal K exists by superimposing some of communication maps M1 to M6 of the communication devices C1 to C6 which are determined to be communicable by the signal processing unit 21 and the other communication maps M1 to M6 of the communication devices C1 to C6 which are determined to be non-communicable by the signal processing unit 21. The communication maps M1 to M6 in this embodiment are formed with two-dimensional coordinates set in advance according to setting positions of the communication devices C1 to C6, and set a range in which a distance to the mobile terminal K can be measured with less communication error or small radio wave loss as the communicable range. In addition, the communication maps M1 to M6 may have three-dimensional coordinates. Here, the communication error is a difference between a true distance and a measured distance value of the distances that can be measured by the communication devices C1 to C6. Hereinafter, the communication error will be described as a ranging error.

Figure 11:
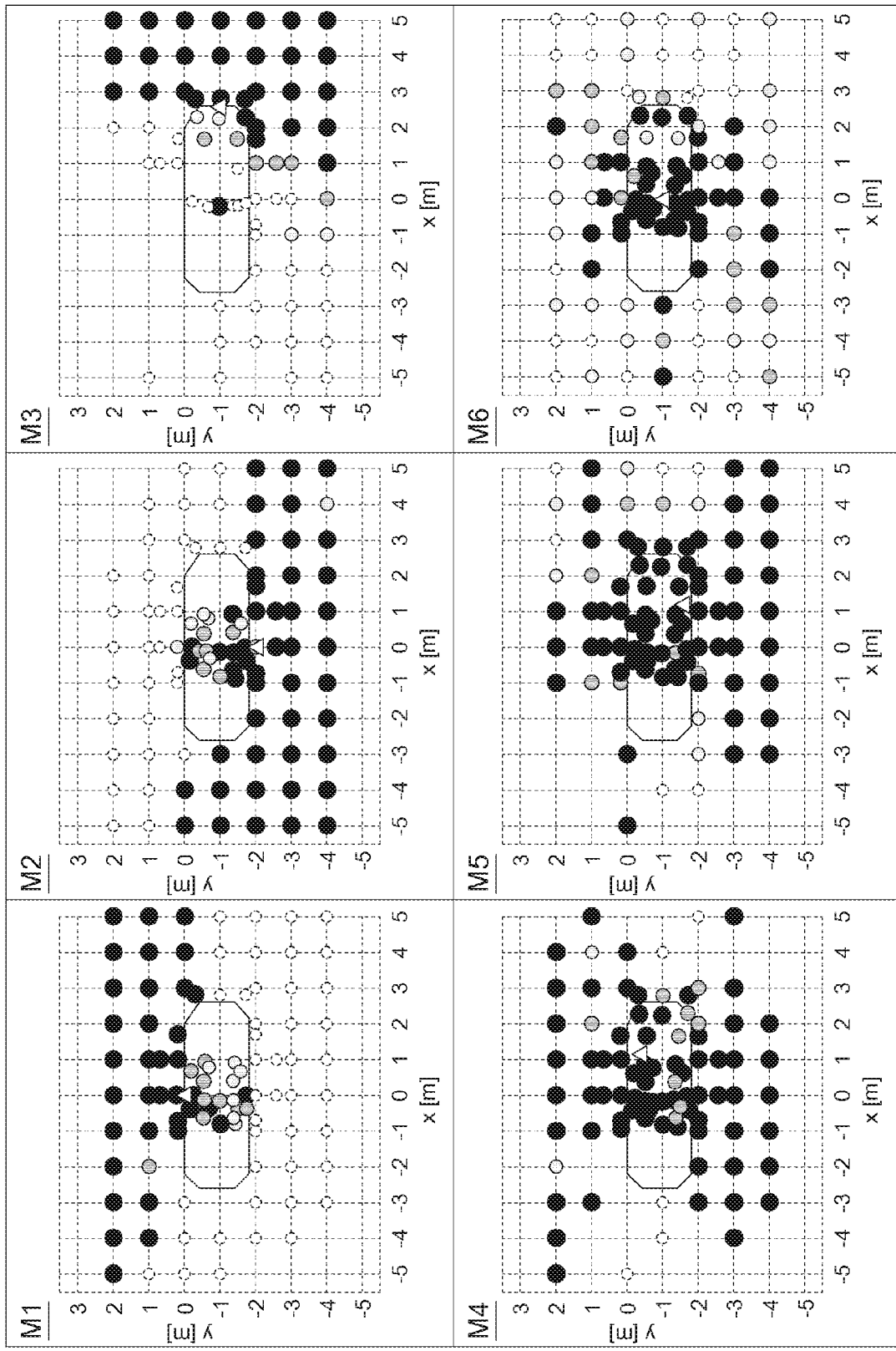
FIG. 11 is an example of communication maps.

FIG. 11 shows communication maps M1 to M6 of the communication devices C1 to C6 in consideration of an ideal ranging error in the absence of disturbance. In FIG. 11, ranges with a ranging error of 50 cm or less are indicated by dark black solid-line circles, ranges with a ranging error of more than 50 cm and 1 m or less are indicated by dark gray circles, ranges with a ranging error of more than 1 m and 3 m or less are indicated by light gray solid-line circles, ranges with a ranging error of more than 3 m are indicated by broken-line circles, and the positions of the communication devices C1 to C6 are indicated by triangular marks. That is, the communication maps M1 to M6 in this embodiment classify the communicable ranges into ranks according to the degree of communication error (ranging error).

The first communication device C1 is communicable with a slight ranging error when the mobile terminal K exists on the right side of the vehicle and exists in the vicinity of a driver seat inside the vehicle cabin (see the communication map M1). The second communication device C2 is communicable with a slight ranging error when the mobile terminal K exists on the left side of the vehicle and exists in the vicinity of a front passenger seat inside the vehicle cabin (see the communication map M2). The third communication device C3 is communicable with a slight ranging error when the mobile terminal K exists behind the vehicle (see the communication map M3). The fourth communication device C4 is communicable with a slight ranging error when the mobile terminal K exists on the left and right sides of the vehicle and inside the vehicle cabin, and is communicable with less disturbance when the mobile terminal K exists on the right side of the vehicle (see the communication map M4). The fifth communication device C5 is communicable with a slight ranging error when the mobile terminal K exists on the left and right sides of the vehicle and inside the vehicle cabin, and is communicable with less disturbance when the mobile terminal K exists on the left side of the vehicle (see the communication map M5). The sixth communication device C6 is communicable with a slight ranging error when the mobile terminal K exists inside the vehicle cabin (see the communication map M6).

For example, when the first communication device C1 is determined to be communicable by the signal processing unit 21, and when mobile terminal K is only communicable with the second communication device C2 at a noise level and the second communication device C2 is determined to be non-communicable by the signal processing unit 21, the area determining unit 22 excludes the communicable range of the communication map M2 of the second communication device C2 from the communicable range of the communication map M1 of the first communication device C1. Therefore, the mobile terminal K can be estimated to be located on the right side of the vehicle. In this way, an overlapping region of the communicable ranges is converged by superimposing all the communication maps M1 to M6, and the existence area of the mobile terminal K can be accurately identified. In other word, it is preferable that the area determining unit 22 excludes a logical product of the communicable ranges of some of the communication devices C1 to C6 which are determined to be non-communicable by the signal processing unit 21 from a logical product of the communicable ranges of the other communication devices C1 to C6 which are determined to be communicable by the signal processing unit 21.

The estimation unit 23 executes ranking of at least three of the communication devices C1 to C6 determined to be communicable by the signal processing unit 21. As an example of the ranking, a higher priority is given in an ascending order of ranging values between the mobile terminal K and the communication devices C1 to C6. That is, the smaller the actual distance, the more accurate ranging value can be acquired, and this ranging value is the most reliable. Therefore, the communication device having the smallest ranging value of the communication devices C1 to C6 is referred to as a "key communication device". Then, the estimation unit 23 narrows down the search range of the mobile terminal K based on the distance value from the key communication device of at least three of the communication devices C1 to C6, estimates the position of the mobile terminal K, and outputs an estimation result to the ECU 15

(an estimation step). When the estimation unit 23 estimates that the mobile terminal K exists at a position on the right side of the vehicle, the ECU 15 transmits an operation signal to the door opening and closing mechanism 3 so as to unlock, lock, open or close a right door. When the estimation unit 23 estimates that the mobile terminal K exists at a position on the left side of the vehicle, the ECU 15 transmits an operation signal to the door opening and closing mechanism 3 so as to unlock, lock, open or close a left door. When the estimation unit 23 estimates that the mobile terminal K exists at a position on a rear side of the vehicle, the ECU 15 transmits an operation signal to the door opening and closing mechanism 3 so as to unlock, lock, open or close a back door. When the estimation unit 23 estimates that the mobile terminal K exists at a position inside the vehicle cabin, the ECU 15 transmits an operation signal to the engine driving mechanism 4, and the engine is in a drivable standby state.

As shown in FIG. 7, the estimation unit 23 provides a plurality of candidate points on the surface of a sphere whose radius is the distance value from the key communication device, and estimates the position of the mobile terminal K. Since it is assumed that the range (search range) where the mobile terminal K exists is on the surface of a sphere whose radius is the ranging value of the key communication device which is the most reliable, it is possible to significantly reduce the number of candidate points used in the calculation. When a plurality of distance values from the key communication device is acquired, it is preferable that the estimation unit 23 narrows down the search range of the mobile terminal K by using the smallest value of the distance values. This is because when an UWB band signal is used as a communication method, the distance value acquired from the communication devices C1 to C6 includes a small value due to a direct wave and a large value due to a detouring wave that detours around a shield, and the small value due to the direct wave is closest to the actual distance.

In addition, the estimation unit 23 may further narrows down the search range of the mobile terminal K based on the existence area of the mobile terminal K determined by the area determining unit 22. For example, on the surface of the sphere whose radius is the distance value from the key communication device, only a portion where the two-dimensional existence area of the mobile terminal K is projected in a z direction (a vertical direction of the automobile A) can be set as the search range. Further, the estimation unit 23 may exclude an unrealistic range (for example, z is 0 or less) such as a range below the bottom of the vehicle cabin of the automobile A from the sphere as the search range. Hereinafter, a front-rear direction of the automobile A will be described as an x direction, a left-right direction as the y direction, and the vertical direction as the z direction.

Three-dimensional coordinates (x, y, and z) of the existence candidate positions of the mobile terminal K are calculated based on three parameters of the ranging value r acquired from the key communication device, an elevation angle θ, and an azimuth angle φ. The elevation angle θ and the azimuth angle φ are optional values, and can be set at a predetermined angular interval (for example, every 10 degrees). After setting the candidate points on the surface of the sphere at the predetermined angular interval and estimating the rough position of the mobile terminal K, in a predetermined range near the estimated position of the mobile terminal K, the estimation unit 23 may provide a plurality of candidate points with the elevation angle θ and the azimuth angle φ at an angular interval (for example, every 1 degree) smaller than the predetermined angular interval, and estimate the position of the mobile terminal K.

In addition, the estimation unit 23 may set the angular interval according to the ranging value acquired from the key communication device. For example, since the smaller the ranging value acquired from the key communication device, the smaller the volume of the sphere, the angular interval may be set small.

In the narrowed down search range, the estimation unit 23 estimates the three-dimensional coordinates (x, y, z) of the existence position of the mobile terminal K by using, for example, an algorithm of least squares method. As shown at a lower part of FIG. 7 (only the x coordinate is displayed), a three-dimensional coordinate (x, y, z), which has the smallest square sum of the difference between a ranging value $r_i$ (i is a communication device number) acquired from each of the communication devices C1 to C6 determined to be communicable by the signal processing unit 21, and an absolute value of the difference between the three-dimensional coordinate of the existence candidate position and the three-dimensional coordinate of each of the communication devices C1 to C6 stored in the storage unit 14, is estimated as the existence position of the mobile terminal K. The ranging value $r_i$ acquired from each of the communication devices C1 to C6 may be a value acquired by one measurement or a statistical value acquired by plural measurements. The statistical value acquired by plural measurements may be an average value or a minimum value, and it is preferable to use the minimum value.

Position Estimation Method for Mobile Terminal

An embodiment of the position estimation method for a mobile terminal will be described with reference to FIGS. 3 to 13.

The vehicle-side transmitting circuit 11 of each of the communication devices C1 to C6 generates a response request signal, and sequentially transmits the response request signal to the mobile terminal K via the vehicle-side antenna 13. An order in which the response request signals are transmitted by the communication devices C1 to C6 may be determined by giving a priority to any one of the communication devices C1 to C6 that has detected the mobile terminal K by other communication, or may be optionally set. In the mobile terminal K that has received the response request signal, the control circuit 6 generates an input signal including the time Tb required for the mobile terminal K to respond after receiving a radio wave and the identification information (ID) of the mobile terminal K, transmits the input signal to the terminal-side communication unit 5, and transmits a response signal generated by modulating an electric signal with the terminal-side communication unit 5 to the vehicle-side antenna 13 via the terminal-side antenna 53 (#31 in FIG. 3). Further, the vehicle-side receiving circuit 12 demodulates the response signal received from the vehicle-side antenna 13, transmits the response signal to the control unit 2, collates the mobile terminal K by the control unit 2, and acquires the distance value and the radio wave intensity value between the authenticated mobile terminal K and each of the communication devices C1 to C6 (#32 in FIG. 3, the acquisition step).

Figure 12:
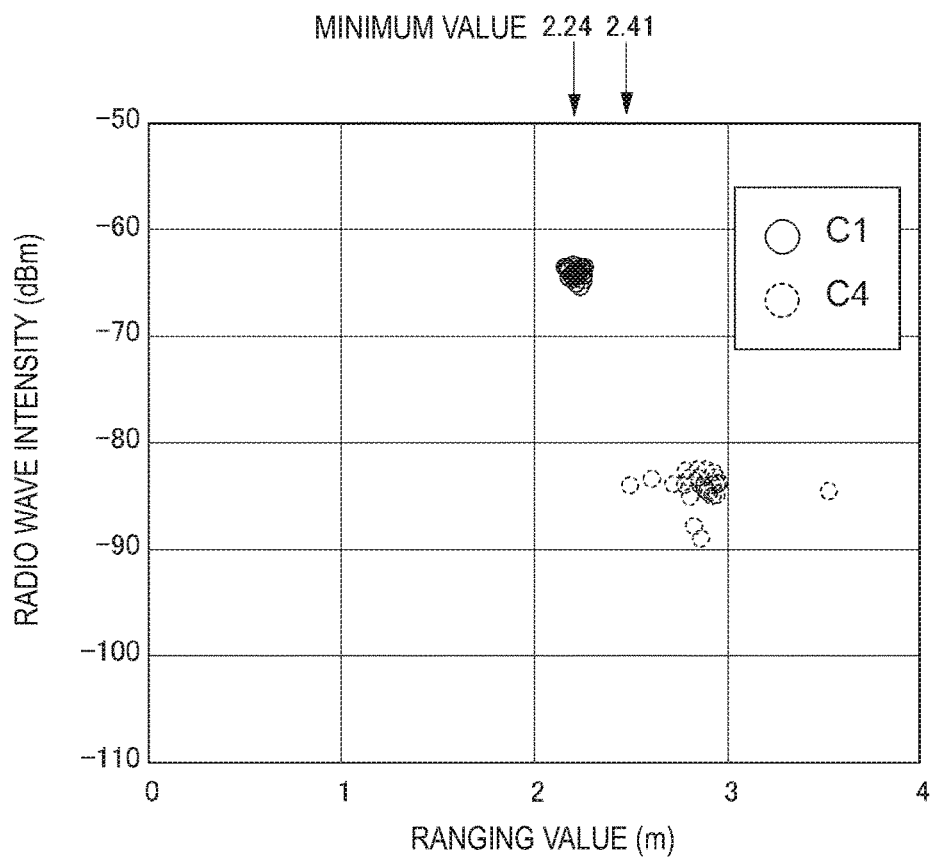
FIG. 12 shows another example of the distance value and the intensity value.

FIGS. 6 and 12 show an example in which the distance value (ranging value) acquired by the control unit 2 is used as a horizontal axis and the radio wave intensity value (radio wave intensity) acquired by the control unit 2 is used as a vertical axis. FIG. 6 shows a ranging value and a radio wave intensity under a condition that the user H sitting in the driver seat of the automobile A puts the mobile terminal K in the chest pocket of the outerwear. In the example shown in FIG. 6, the communication devices other than the third communication device C3 are communicable. FIG. 12 shows a ranging value and a radio wave intensity under a condition that the user H holds the mobile terminal K in a hand and stands at a position on the right side (2 m on the right side, 1 m on the back side with respect to the first communication device C1) of the automobile A. In such a case, as shown in FIG. 12, only the first communication device C1 and the fourth communication device C4 are communicable. In the example shown in FIG. 12, it is presumed that the reason why the fifth communication device C5 and the sixth communication device C6 having a ranging error of 1 m or less are non-communicable is due to the disturbance.

Returning to FIG. 3, the signal processing unit 21 determines whether there are at least three of the communication devices C1 to C6 that are succeeded in communication (communicable), in which the communication devices have the distance values which are equal to or less than the first predetermined value, and have the intensity values which are equal to or more than the second predetermined value (#33 in FIG. 3, the communication availability determination step). As a result of the determination in #33, if the number of the communication devices C1 to C6 is less than three (No in #33 of FIG. 3), the communication is attempted again between the communication devices C1 to C6 and the mobile terminal K (#31 to #32 of FIG. 3).

In addition, if the number of the communication devices C1 to C6 is less than three, the position of the mobile terminal K may be estimated based on the determination result of the area determining unit 22. In such a case, the position of the mobile terminal K may be estimated by excluding the logical product of the communicable ranges of some of the communication devices C1 to C6 which are determined to be non-communicable by the signal processing unit 21 from the logical product of the communicable ranges of the other communication devices C1 to C6 which are determined to be communicable by the signal processing unit 21.

Figure 13:
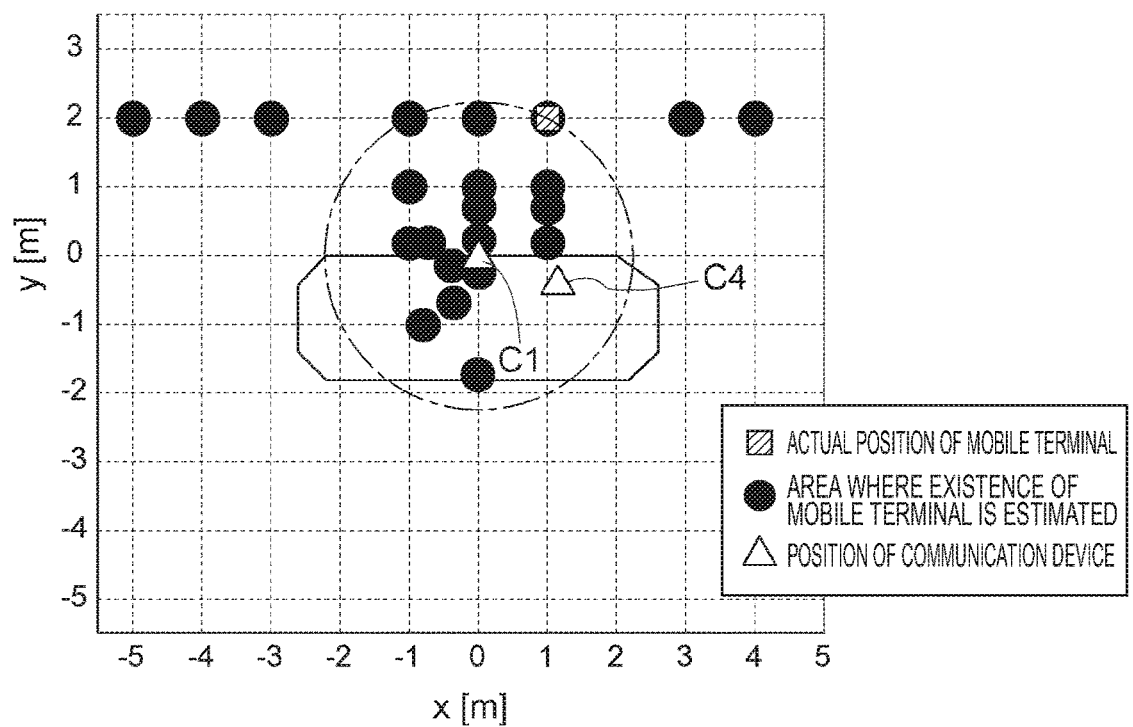
FIG. 13 is an example showing a position estimation result of a mobile terminal according to another embodiment.

FIG. 13 shows a result acquired by excluding a logical product of the communicable ranges having a ranging error of 0.5 m or less and more than 3 m of the second communication device C2, the third communication device C3, the fifth communication device C5 and the sixth communication device C6 which are non-communicable, from a logical product of the communicable ranges having a ranging error of 0.5 m or less of the first communication device C1 and the fourth communication device C4 which are communicable shown in FIG. 12. In this embodiment, since the communicable range of the third communication device C3 excessively shifts toward the rear, it is determined that the mobile terminal K exists inside and outside the vehicle cabin. Therefore, in the existence area of the mobile terminal K narrowed down by the area determining unit 22, the estimation unit 23 estimates a range existing in the area in the estimation circle whose radius is the distance value from the communication device of the communication devices C1 to C6 having the smallest distance value as the position of the mobile terminal K. In the example shown in FIG. 13, in the existence area of the mobile terminal K, an estimation circle (the dashed line circle in FIG. 13) using the distance value from the first communication device C1 having the smallest distance value as radius is drawn, and a range (black circles in FIG. 13) of this estimation circle that exists in the area is shown. The distance value from the first communication device C1 which is the radius of the estimation circle preferably uses the smallest value of the distance values from the first communication device C1. As shown in FIG. 13, with respect to the actual existence position of the mobile terminal K (the diagonally painted square in FIG. 13), the estimation position of the mobile terminal K is included in an error range of 3 m in the front-rear direction of the automobile A, and it can be accurately estimated that the mobile terminal K exists outside the vehicle cabin of the right door.

Returning to FIG. 3, as a result of the determination of #33, if there are at least three of the communication devices C1 to C6 that are succeeded in communication (Yes in #33 of FIG. 3), the estimation unit 23 executes the ranking of the communication devices C1 to C6 (#34 of FIG. 3). Specifically, as shown in FIG. 6, a higher priority is given in the ascending order of ranging values between the mobile terminal K and the communication devices C1 to C6, and the sixth communication device C6, the first communication device C1, the fourth communication device C4, the second communication device C2, and the fifth communication device C5 are set in the descending order of priorities. According to this ranking, when there are at least two of the communication devices C1 to C6 which have the same ranging value, the higher the radio wave intensity value of the communication devices C1 to C6, the higher the priority.

Next, the estimation unit 23 narrows down the search range of the mobile terminal K (#35 in FIG. 3, the estimation step). In order to narrow down the search range, first, the communication device of the communication devices C1 to C6 that has the smallest ranging value with the mobile terminal K is selected as the "key communication device" (#41 in FIG. 4). In the example shown in FIG. 6, the sixth communication device C6 having a first ranking is the key communication device. Next, among the distance values acquired from the sixth communication device C6 which is the selected key communication device, a sphere whose radius is a distance value with the smallest ranging value is generated (#42 in FIG. 4). Next, a plurality of candidate points with the elevation angle θ and the azimuth angle φ at a predetermined angular interval (for example, every 10 degrees) are set on the surface of the sphere (#43 in FIG. 4). Next, when the search range is further narrowed down (Yes in #44 of FIG. 4), the search range of the mobile terminal K is further narrowed down by using the communication maps M1 to M6 based on the existence area of the mobile terminal K determined by the area determining unit 22 (#45).

In the determination of the existence area of the mobile terminal K, first, the two-dimensional communication maps M1 to M6 as shown in FIG. 11 are read from the storage unit 14, and then the area determining unit 22 determines the existence area of the mobile terminal K by excluding the logical product of the communicable ranges of some of the communication devices C1 to C6 determined to be non-communicable by the signal processing unit 21 from the logical product of the communicable ranges of the other communication devices C1 to C6 determined to be communicable by the signal processing unit 21 (#51 to #53 of FIG. 5). Then, the area determining unit 22 outputs the two-dimensional existence area of the mobile terminal K on the surface of the sphere whose radius is the distance value from the key communication device, and the estimation unit 23 sets only the portion where this existence area is projected in the z direction as the search range (#54 in FIG. 5).

Returning to FIG. 3, in the set search range of the mobile terminal K, the candidate points are provided on the surface of the sphere at the predetermined angular interval, and the position of the mobile terminal K is estimated by the least squares method or the like (#36 in FIG. 3). For this position estimation, among the candidate points provided in the predetermined range, a three-dimensional coordinate, which has the smallest square sum of the difference between the ranging value acquired from each of the communication devices C1 to C6 determined to be communicable by the signal processing unit 21, and an absolute value of the difference between the three-dimensional coordinate of the existence candidate position and the three-dimensional coordinate of each of the communication devices C1 to C6 stored in the storage unit 14, is estimated as the existence position of the mobile terminal K (see the equation at the bottom right of FIG. 7). In addition, in the predetermined range near the estimated position of the mobile terminal K estimated in #36, a plurality of candidate points may be further provided with the elevation angle θ and the azimuth angle φ at an angular interval (for example, every 1 degree) smaller than the predetermined angular interval, and the precise position of the mobile terminal K may be further estimated by the least squares method or the like.

Figure 8:
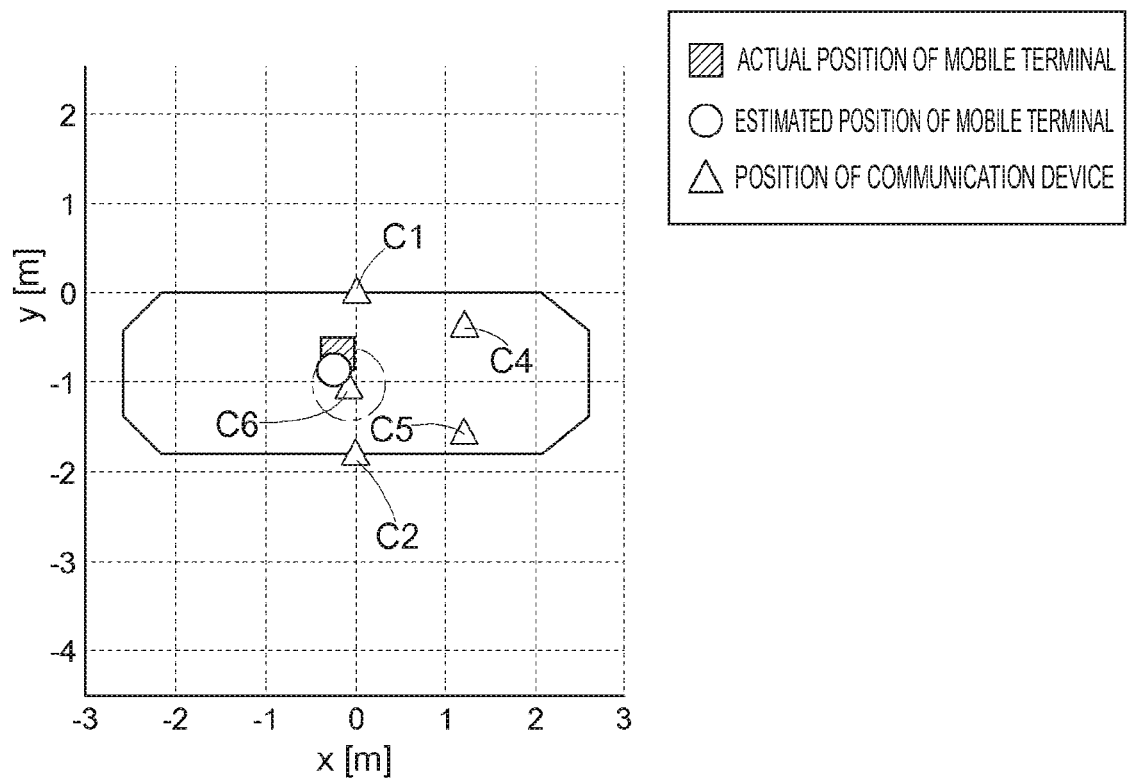
FIG. 8 is an example showing a position estimation result of the mobile terminal according to this embodiment.

FIG. 8 shows a result of the matter that the estimation unit 23 generates a sphere whose radius is the distance value acquired from the sixth communication device C6 which is the selected key communication device (the dashed line in FIG. 8), sets a plurality of candidate points at the predetermined angular interval (every 10 degrees) on the surface of this sphere, and estimates the existence position of the mobile terminal K by the least squares method. As shown in FIG. 8, the estimation position (the white circle in FIG. 8) of the mobile terminal K is close to the actual position of the mobile terminal K (black-painted square in FIG. 8), and it can be accurately estimated that the mobile terminal K exists in the driver seat inside the vehicle cabin.

Returning to FIG. 3, the estimation unit 23 outputs the existence position of the mobile terminal K to the ECU 15, and based on this existence position, the ECU 15 executes a signal processing such as transmitting an operation signal to the door opening and closing mechanism 3 so as to unlock, lock, open or close the left door (#37 of FIG. 3).

Figure 9:
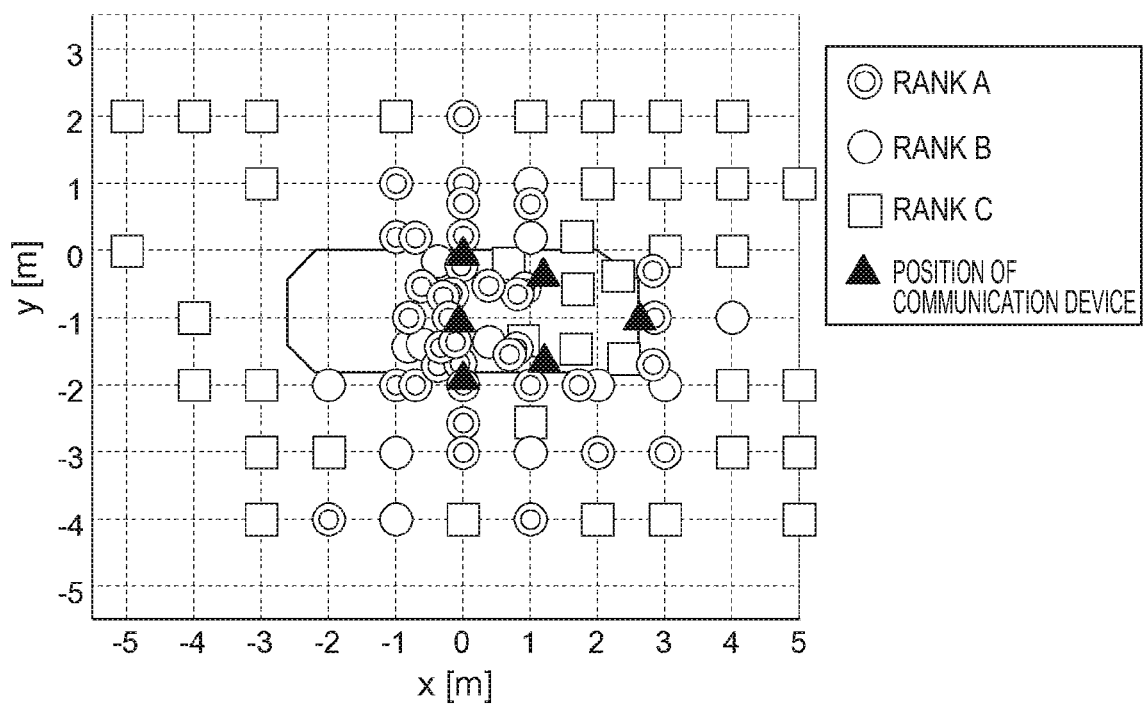
FIG. 9 is a diagram showing an estimation error according to this embodiment.
Figure 10:
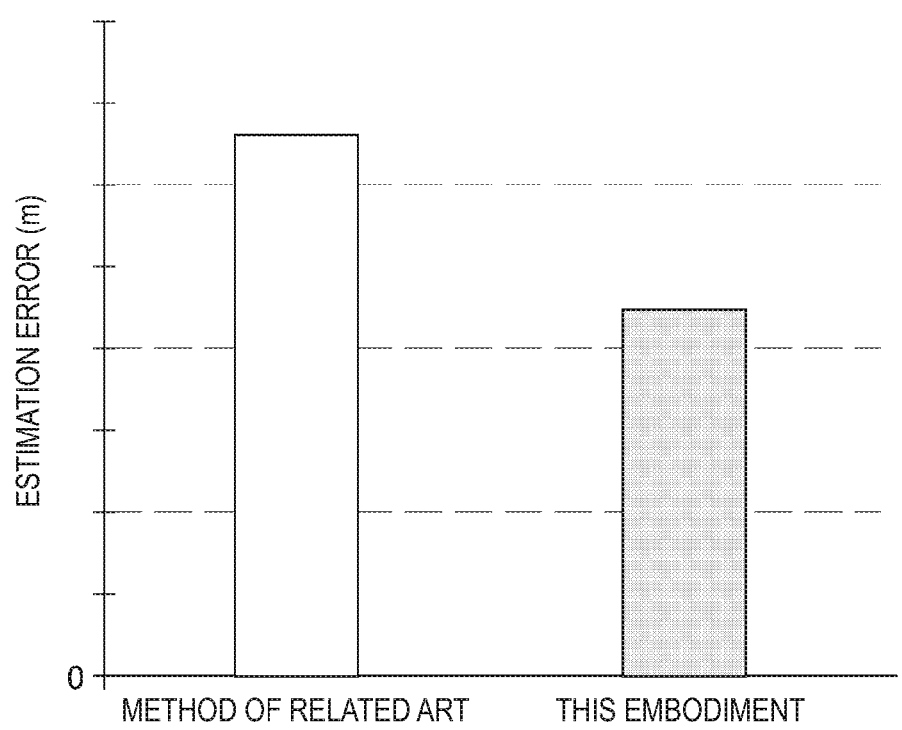
FIG. 10 is a comparison diagram of the estimation error.

FIGS. 9 to 10 show an estimation result using the above-mentioned position estimation method for a mobile terminal when the mobile terminal K exists inside and outside the vehicle cabin (a parameter is 100 or more). According to this estimation result, the estimation unit 23 generates a sphere whose radius is the distance value acquired from the selected key communication device, sets a plurality of candidate points with the elevation angle θ and the azimuth angle φ at the predetermined angular interval (every 10 degrees) on the surface of this sphere, and estimates the existence position of the mobile terminal K by the least squares method. As shown in FIG. 9, good estimation results (rank A) are apparent in an area within about 0.7 m from the left and right doors and a trunk. According to these estimation results, it is apparent that the position estimation of the mobile terminal K has sufficient accuracy in an area important for the keyless entry system. Further, FIG. 10 shows estimation errors acquired by using a method of the related art in which the estimation unit 23 performs the calculation without generating a sphere, unlike this embodiment, and the position estimation method for a mobile terminal of this embodiment. As shown in FIG. 10, it can be understood that the estimation error is reduced as compared to that of the method of the related art. In addition, an estimation speed of this embodiment is 120 times faster than that of the method of the related art.

Other Embodiments (1) Although the estimation unit 23 of the above-described embodiment creates the sphere whose radius is the distance value from the communication device of the communication devices C1 to C6 that has the smallest distance value, the estimation unit 23 may calculates a radius with the statistical method and then creates the sphere. In addition, the sphere may be created by using a deep learning method or the like.

(2) In the above-described embodiment, the area determining unit 22 excludes the logical product of the communicable ranges of some of the communication devices C1 to C6 which are determined to be non-communicable by the signal processing unit 21 from the logical product of the communicable ranges of the other communication devices C1 to C6 which are determined to be communicable by the signal processing unit 21. Alternatively, the area determining unit 22 may determine the existence area of the mobile terminal K based on the logical product of the logical product of the communicable ranges of some of the communication devices C1 to C6 which are determined to be communicable by the signal processing unit 21 and a logical sum of non-communicable ranges of the other communication devices C1 to C6 which are determined to be non-communicable by the signal processing unit 21.

This disclosure is applicable to a position estimation method for a mobile terminal, a position estimation device for a mobile terminal and a position estimation system for a mobile terminal which estimate a position of a mobile terminal in a vicinity of a vehicle.

A position estimation method for a mobile terminal according to this disclosure is a position estimation method for a mobile terminal that estimates a position of a mobile terminal by communicating at least three of communication devices provided in a vehicle with the mobile terminal in a vicinity of the vehicle, the method includes: an acquisition step of acquiring distance values and radio wave intensity values between a plurality of the communication devices and the mobile terminal by communicating the communication devices with the mobile terminal; a communication availability determination step of determining that a corresponding communication device is communicable when the distance value is equal to or less than a first predetermined value and the intensity value is equal to or more than a second predetermined value; and an estimation step of narrowing down a search range of the mobile terminal based on a distance value from the communication device having the smallest distance value of at least three of communication devices determined to be communicable in the communication availability determination step, and estimating the position of the mobile terminal.

A position estimation device for a mobile terminal according to this disclosure is a position estimation device for a mobile terminal that estimates a position of a mobile terminal by communicating a plurality of communication devices provided in a vehicle with the mobile terminal in a vicinity of the vehicle, the device includes: a signal processing unit configured to acquire distance values and radio wave intensity values between the plurality of communication devices and the mobile terminal by communicating the communication devices with the mobile terminal, and determine that a corresponding communication device is communicable when the distance value is equal to or less than a first predetermined value and the intensity value is equal to or more than a second predetermined value; and an estimation unit configured to narrow down a search range of the mobile terminal based on a distance value from the communication device having the smallest distance value of at least three of communication devices determined to be communicable by the signal processing unit, and estimate the position of the mobile terminal.

A position estimation system for a mobile terminal according to this disclosure includes: a plurality of communication devices provided in a vehicle; a signal processing unit configured to acquire distance values and radio wave intensity values between the plurality of communication devices and a mobile terminal in a vicinity of the vehicle by communicating the communication devices with the mobile terminal, and determine that a corresponding communication device is communicable when the distance value is equal to or less than a first predetermined value and the intensity value is equal to or more than a second predetermined value; and an estimation unit configured to narrow down a search range of the mobile terminal based on a distance value from the communication device having the smallest distance value of at least three of communication devices determined to be communicable by the signal processing unit, and estimate the position of the mobile terminal.

In this method or in this configuration, the search range of the mobile terminal is narrowed down based on the distance value from the communication device having smallest distance value with the mobile terminal. That is, since a range for searching the mobile terminal is narrowed down by using the distance value of the communication device which is closest to the mobile terminal and has less communication error, a calculation speed can be increased. Further, since a probability that the mobile terminal exists in a vicinity of the search range based on the distance value of the communication device having less communication error is extremely high, the ranging accuracy can be improved.

Therefore, it is possible to provide the position estimation method for a mobile terminal, the position estimation device for a mobile terminal, and the position estimation system for a mobile terminal which can improve the accuracy of estimation on the position of the mobile terminal.

Other feature configuration of this disclosure is that, in the estimation step, the position of the mobile terminal is estimated by providing a plurality of candidate points on a surface of a sphere whose radius is the distance value from the communication device having the smallest distance value.

As in this method, if the search range is set on the surface of a sphere and a plurality of candidate points are provided on this surface, the calculation speed can be further improved as compared to a case in the related art where candidate points are provided in the entire area near the vehicle.

Other feature of this disclosure is that, in the estimation step, after the position of the mobile terminal is estimated by providing the candidate points on the surface of the sphere at a predetermined angular interval, the position of the mobile terminal is further estimated by providing the candidate points at an angular interval smaller than the predetermined angular interval in a predetermined range near the estimated position of the mobile terminal.

As in this method, if the candidate points are provided with finer resolution and the position of the mobile terminal is estimated after narrowing down a rough existence range of the mobile terminal on the surface of the sphere, the ranging accuracy can be further improved. In addition, the calculation speed can be increased as compared with a case where the candidate points are provided with fine resolution from the beginning.

Other feature of this disclosure is that, in the estimation step, an area where the mobile terminal exists is estimated based on a determination result of the communication availability determination step and communication maps that map communicable ranges of the communication devices, and the search range of the mobile terminal is further narrowed down based on the area.

In this method, the area where the mobile terminal exists is estimated based on the communication maps and the determination result of the communication availability determination step. That is, if the communicable ranges of the communication devices that are communicable are superimposed by using communication maps predetermined by an arrangement of the communication devices, the area where the mobile terminal exists can be quickly narrowed down. When the search range of the mobile terminal is further narrowed down by using this existence area, the ranging accuracy can be further improved while increasing the calculation speed.

Other feature configuration of this disclosure is that, in the estimation step, the search range of the mobile terminal is narrowed down by using the smallest distance value of the plurality of distance values from the communication device having the smallest distance value.

It is found that when an UWB band signal is used for a communication method, the distance value acquired from the communication device tends to be larger than the actual distance value. Therefore, as in this method, if the search range of the mobile terminal is narrowed down by using the smallest distance value, the ranging accuracy can be further improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A position estimation method for a mobile terminal that estimates a position of a mobile terminal by communicating at least three of communication devices provided in a vehicle with the mobile terminal in a vicinity of the vehicle, the method comprising:
  an acquisition step of acquiring distance values and radio wave intensity values between a plurality of the communication devices and the mobile terminal by communicating the communication devices with the mobile terminal;
  a communication availability determination step of determining that a corresponding communication device is communicable when the distance value is equal to or less than a first predetermined value and the intensity value is equal to or more than a second predetermined value; and
  an estimation step of narrowing down a search range of the mobile terminal based on a distance value from the communication device having the smallest distance value of at least three of communication devices determined to be communicable in the communication availability determination step, and estimating the position of the mobile terminal.

2. The position estimation method for a mobile terminal according to claim 1, wherein
in the estimation step, the position of the mobile terminal is estimated by providing a plurality of candidate points on a surface of a sphere whose radius is the distance value from the communication device having the smallest distance value.

3. The position estimation method for a mobile terminal according to claim 2, wherein
in the estimation step, after the position of the mobile terminal is estimated by providing the candidate points on the surface of the sphere at a predetermined angular interval, the position of the mobile terminal is further estimated by providing the candidate points at an angular interval smaller than the predetermined angular interval in a predetermined range near the estimated position of the mobile terminal.

4. The position estimation method for a mobile terminal according to claim 1, wherein
in the estimation step, an area where the mobile terminal exists is estimated based on a determination result of the communication availability determination step and communication maps that map communicable ranges of the communication devices, and the search range of the mobile terminal is further narrowed down based on the area.

5. The position estimation method for a mobile terminal according to claim 1, wherein
in the estimation step, the search range of the mobile terminal is narrowed down by using the smallest distance value of the plurality of distance values from the communication device having the smallest distance value.

6. The position estimation method for a mobile terminal according to claim 1, wherein the distance values are actual distances.

7. The position estimation method for a mobile terminal according to claim 1, wherein the distance values are measured using time of flight.

8. A position estimation device for a mobile terminal that estimates a position of a mobile terminal by communicating a plurality of communication devices provided in a vehicle with the mobile terminal in a vicinity of the vehicle, the device comprising:
a signal processing unit configured to acquire distance values and radio wave intensity values between the plurality of communication devices and the mobile terminal by communicating the communication devices with the mobile terminal, and determine that a corresponding communication device is communicable when the distance value is equal to or less than a first predetermined value and the intensity value is equal to or more than a second predetermined value; and
an estimation unit configured to narrow down a search range of the mobile terminal based on a distance value from the communication device having the smallest distance value of at least three of communication devices determined to be communicable by the signal processing unit, and estimate the position of the mobile terminal.

9. A position estimation system for a mobile terminal, the system comprising:
a plurality of communication devices provided in a vehicle;
a signal processing unit configured to acquire distance values and radio wave intensity values between the plurality of communication devices and a mobile terminal in a vicinity of the vehicle by communicating the communication devices with the mobile terminal, and determine that a corresponding communication device is communicable when the distance value is equal to or less than a first predetermined value and the intensity value is equal to or more than a second predetermined value; and
an estimation unit configured to narrow down a search range of the mobile terminal based on a distance value from the communication device having the smallest distance value of at least three of communication devices determined to be communicable by the signal processing unit, and estimate the position of the mobile terminal.

* * * * *